UNITED STATES PATENT OFFICE.

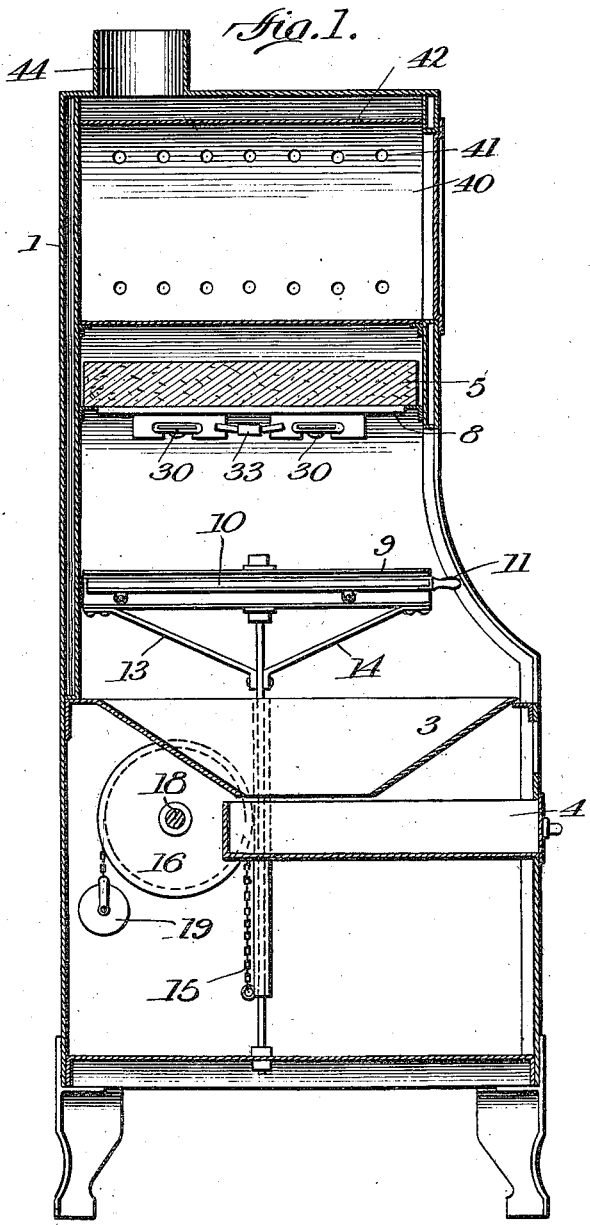

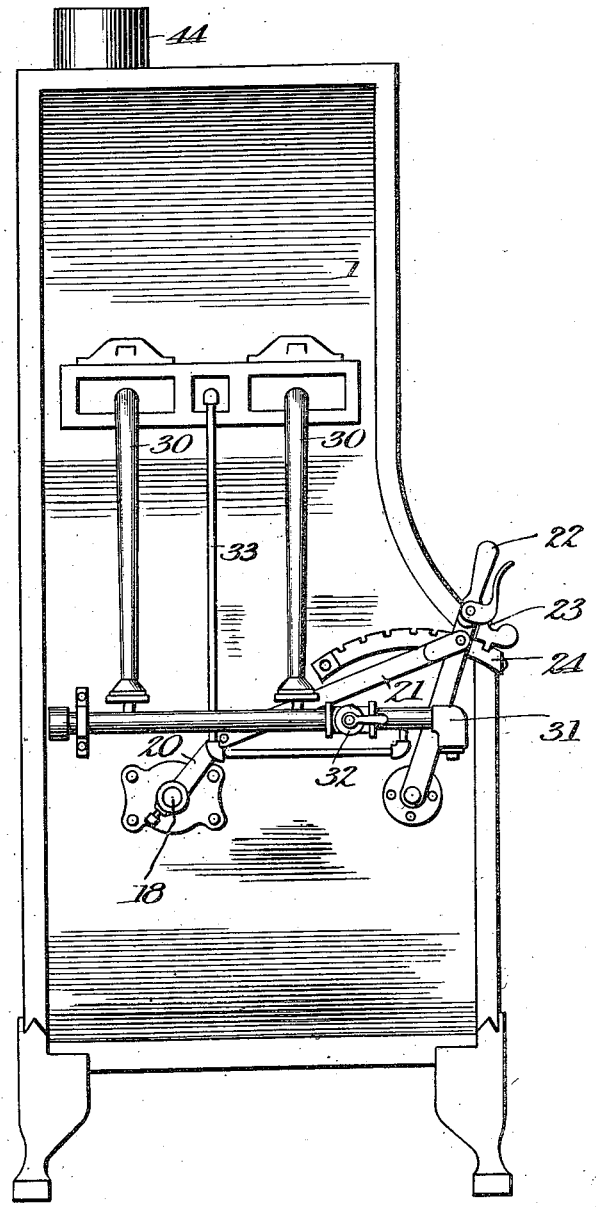

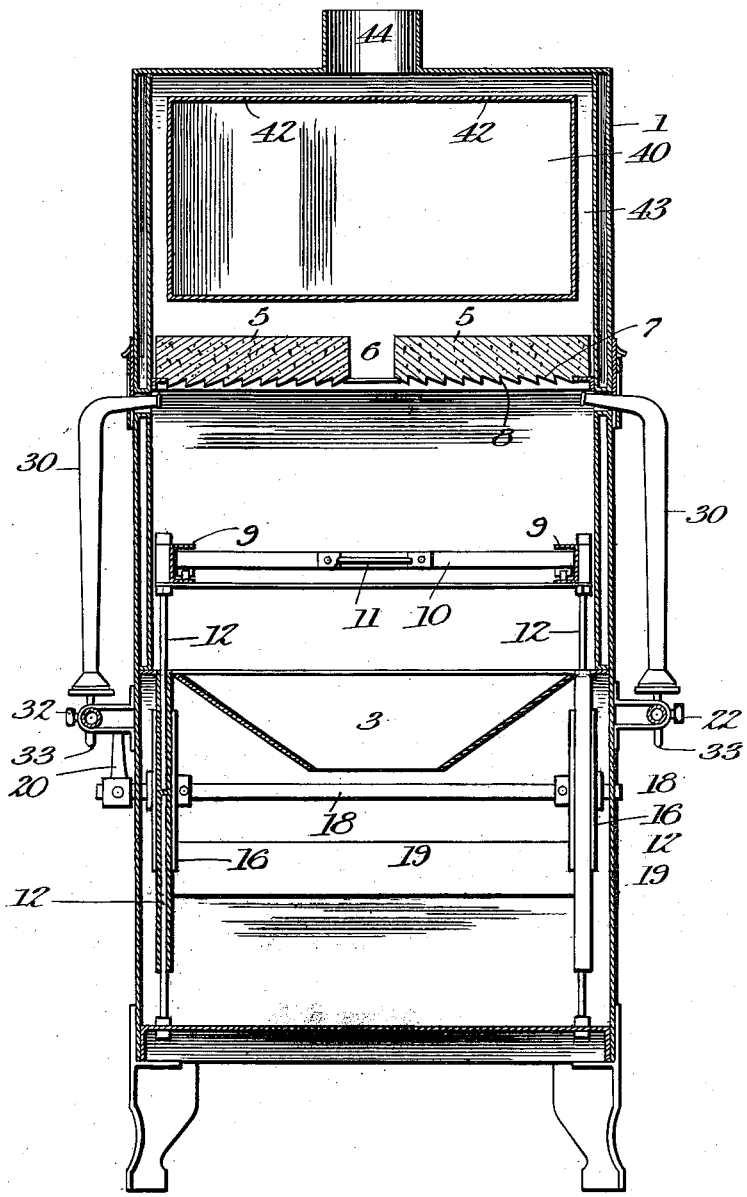

JOHN EDWARD GLOEKLER, OF PITTSBURGH, PENNSYLVANIA.

COOKING-RANGE.

1,165,004.

Specification of Letters Patent.

Patented Dec. 21, 1915.

Application filed February 2, 1915. Serial No. 5,757.

*To all whom it may concern:*

Be it known that I, JOHN EDWARD GLOEKLER, a citizen of the United States, residing at Pittsburgh, in the county of Allegheny and State of Pennsylvania, have invented new and useful Improvements in Cooking-Ranges, of which the following is a specification.

My present invention pertains to cooking ranges.

One of the objects of the invention is to provide a range designed more particularly for meat broiling purposes and embodying improved means for moving the meat toward and from the heating element and for adjustably fixing the meat at various distances from the said element, this in order that the meat may be readily positioned as desired relative to the heating element, may be conveniently inspected by the chef, as occasion demands, and may be cooked fast or slow, according to its nature.

Another object of the invention is the provision in a range, of a heating element comprising a body of refractory material such as fire clay, and means for heating the same to a high degree; the said body being calculated to give off or radiate a steady or uniform volume of heat.

Another object is the provision in combination with a body of the kind stated provided with a serrated surface, of a burner constructed and arranged to throw a blast of flame and other products of combustion against said surface; the serrated surface serving to retard the blast with a view to utilizing all of the heat values, and also serving to increase the area of the radiating surface of the body.

Another object is to so arrange one or more bodies of refractory material and means for heating the same, relative to an oven and flues, that heat and products of combustion passing from the said body or bodies will be utilized to advantage in the heating of the oven.

Another object is the provision of means for collecting and conveniently removing the drippings from the meat that is being broiled.

Other advantageous characteristics of the invention will be fully understood from the following description and claims when the same are read in connection with the drawings, accompanying and forming part of this specification, in which:

Figure 1 is a vertical section of a range constructed in accordance with my invention. Fig. 2 is a side elevation of the range. Fig. 3 is a vertical section of the range, taken in a plane at right-angles to Fig. 1.

Similar numerals of reference designate corresponding parts in all of the views of the drawings.

The casing 1 of my novel range is open at its front, as indicated by 2, and contains a hopper 3, designed to catch and concentrate the drippings from the meat that is being broiled, and a slidable drawer 4 disposed under and adapted to receive drippings from said hopper. The drawer 4 is intended to be removed at intervals whereupon the collected grease may be conveniently discharged therefrom.

Supported in the casing above the opening 2 are bodies 5 of fire clay or other suitable refractory material. These bodies are separated by an intervening vertical space 6, and are provided at their under sides with ribs 7. These ribs extend continuously between the back and front portions of the casing and have abrupt surfaces 8 at their outer sides, designed to offer abutments to flames and products of combustion that are discharged inwardly from points adjacent to the side walls of the casing, as hereinafter specifically pointed out. The ribs 7 materially increase the radiating surfaces of the bodies 5, and at the same time the abrupt outer sides of the said ribs serve to check the flames and other products of combustion from the burners 30 and retain the said flames and products of combustion in proximity to the undersides of the bodies 5 which promotes the quick and thorough heating thereof. Movable forwardly and rearwardly in channel irons 9 is a meat support or grid-iron 10, having a handle 11, whereby it may be drawn outwardly from or pushed back into the position shown in Fig. 1.

The channel irons 9 with the support or grid-iron 10 therein are designed to move up and down as a unit and to be retained in a horizontal position during such movements. To the attainment of this end, vertical bars 12 are fixed to and depend from the channel irons 9, and brace bars 13 and 14 are interposed between and fixed to said bars 12 and the channel irons 9. The bars 12 are movable vertically and suitably guided in their vertical movements, and connected with the lower portions of the bars are cables 15 which extend over and are connected to wheels 16, Figs. 1 and 3, fixed on a transverse shaft 18, and are provided at their opposite ends, with reference to the bars 12, with counterbalance weights 19, designed to assist in raising the grid-iron and to facilitate placing the same in the various positions desired. The transverse shaft 18 is also equipped with an arm 20, Figs. 2 and 3, arranged exterior of the casing. This arm 20 is connected through a link 21 to a lever 22 which is arranged as shown so as to be conveniently manipulated by a chef standing in front of the range. Said lever is provided with a suitable detent 23 through the medium of which the lever may be fixed adjustably in various positions with respect to a fixed rack 24.

By virtue of the construction described it will be manifest that the chef is enabled to move the grid-iron 10 and the meat thereon toward and from the bodies 5, and is also enabled to adjustably fix the grid-iron at various distances from the said bodies, and is further enabled to bring the grid-iron and the meat thereon down sufficiently to enable him to conveniently inspect the state of the meat.

At each side of the casing are two burners 30, designed to be connected through a pipe 31 with a suitable source of natural or artificial gas supply. Each pipe 31 is equipped with a cut-off valve 32, and leading from each pipe 31 is a pilot-light pipe 33, the discharge end of which is arranged between two of the burners 30. The connections of the pipes 33 with the pipes 31 are at points between the valves 32 and the source of supply, and consequently gas will be supplied at all times to the pilot-light burners. Then when the valves 32 are open, the burners 30 will be ignited and heat and other products of combustion will be thrown inwardly against the lower ribbed surfaces of the bodies 5. Manifestly when desired only one of the valves 32 can be opened in which case only one of the bodies 5 will be heated. This is desirable when a small portion of meat is to be heated or cooked on one side of the grid-iron 10.

Arranged above the bodies 5 is the oven 40. This oven is provided with apertures 41 and 42 for the passage of heat, and is surrounded by flues 43, designed to conduct products of combustion from the space 6 and the refractory bodies 5 to an uptake 44. By virtue of this provision it will be manifest that the products of combustion from the burners 30 as well as the heat given off by the bodies 5 will be carried around the oven and utilized to heat the same before they are permitted to pass out through the uptake 44.

It is to be noticed that when the hand-lever is released and moved in one direction the grid-iron, will gravitate proportionately to the movement of the hand-lever and take up slack of the cables, while when the hand lever is moved in the opposite direction, the grid-iron will be positively raised through the medium of the transverse-shaft, the wheels, the cables and the vertically-movable bars.

Having described my invention, what I claim and desire to secure by Letters-Patent, is:

1. The combination in a cooking range, of a casing having an uptake at its upper end, means in the casing for supporting substance to be cooked, horizontal bodies of refractory material arranged in the casing and separated by an intervening space located in the vertical center of the range and having continuous ribs at their sides adjacent to the supporting means; said ribs having abrupt outer sides, burners extending through opposite side walls of the casing and arranged to jet flames against said abrupt sides of the ribs, pipes leading from a source of gas supply to said burners, valves in said pipes, pilot-light pipes leading from said pipes, at points between the source of gas supply and the valves, to points adjacent to the burners, whereby either body, alone, may be heated, and an oven arranged above and spaced from the said bodies and also spaced from the side walls and the top wall of the casing.

2. In a cooking range, the combination of a casing, means in the casing for supporting substance to be cooked, horizontal bodies of refractory material arranged in the casing and separated by an intervening vertical space, means at opposite sides of the casing for heating the refractory bodies separately or in concert, and means whereby either heating means may be put in operation to heat its respective refractory body, independently of the other heating means.

In testimony whereof I have hereunto set my hand in presence of two subscribing witnesses.

JOHN EDWARD GLOEKLER.

Witnesses:
C. H. ROBB,
A. P. JASPERSON.